United States Patent
Piszczek et al.

(10) Patent No.: US 8,661,218 B1
(45) Date of Patent: *Feb. 25, 2014

(54) METHOD FOR REDUCING LATENCY IN A SOLID-STATE MEMORY SYSTEM WHILE MAINTAINING DATA INTEGRITY

(75) Inventors: Michael Piszczek, Laurel, MD (US); J. Gordon Manning, Ellicott City, MD (US); Cedric Fernandes, Columbia, MD (US)

(73) Assignee: DataDirect Networks, Inc., Chatsworth, CA (US)

( * ) Notice: Subject to any disclaimer, the term of this patent is extended or adjusted under 35 U.S.C. 154(b) by 271 days.

This patent is subject to a terminal disclaimer.

(21) Appl. No.: 13/240,507

(22) Filed: Sep. 22, 2011

Related U.S. Application Data (63) Continuation-in-part of application No. 11/907,843, filed on Oct. 18, 2007, now Pat. No. 8,095,763.

(51) Int. Cl.
  G06F 12/00 (2006.01)
(52) U.S. Cl.
  USPC .......... 711/167; 711/114; 711/103; 714/6.24; 714/748
(58) Field of Classification Search
  USPC .................. 711/103, 114, 167; 714/6.24, 748
  See application file for complete search history.

(56) References Cited

U.S. PATENT DOCUMENTS

| | | | |
|---|---|---|---|
| 5,522,031 A | 5/1996 | Ellis et al. | |
| 6,453,345 B2 | 9/2002 | Trcka et al. | |
| 7,127,668 B2 | 10/2006 | McBryde et al. | |
| 7,366,852 B2 | 4/2008 | Hung | |
| 2001/0008007 A1 | 7/2001 | Halligan et al. | |
| 2003/0163639 A1 | 8/2003 | Baum et al. | |

FOREIGN PATENT DOCUMENTS

GB  2432440 A  5/2007

*Primary Examiner* — Kalpit Parikh
(74) *Attorney, Agent, or Firm* — Rosenberg, Klein & Lee

(57) ABSTRACT

A latency reduction method for read operations of an array of N solid-state storage devices having n solid-state storage devices for data storage and p solid-state storage devices for storing parity data is provided. Utilizing the parity generation engine fault tolerance for a loss of valid data from at least two of the N solid-state storage devices, the integrity of the data is determined when N−1 of the solid-state storage devices have completed executing a read command. If the data is determined to be valid, the missing data of the $N^{th}$ solid-state storage device is reconstructed and the data transmitted to the requesting processor. By that arrangement the time necessary for the $N^{th}$ solid-state storage device to complete execution of the read command is saved, thereby improving the performance of the solid-state memory system.

20 Claims, 2 Drawing Sheets

METHOD FOR REDUCING LATENCY IN A SOLID-STATE MEMORY SYSTEM WHILE MAINTAINING DATA INTEGRITY

REFERENCE TO RELATED APPLICATION

The present Patent application is a Continuation-in-Part of the patent application Ser. No. 11/907,843 filed on 18 Oct. 2007.

FIELD OF THE INVENTION

The present invention is directed to a method for reducing latency in read operations of an array of solid-state storage devices while insuring that valid data is provided therefrom.

More particularly, the present invention is directed to a method of transferring data from less than all of the solid-state storage devices of the array to a stage buffer memory, checking the integrity thereof, and reconstructing the data not transferred if the transferred data is valid.

Still further, the present invention takes advantage of a dual parity generation engine's fault tolerance for a loss of valid data from at least any two of the plurality of solid-state storage devices to transfer and integrity check data from N−1 of N solid-state storage channels to reduce latency of the memory array that would result if the memory array had to wait for a lagging $N^{th}$ solid-state storage device to finish its individual read operation. The dual parity generation engine is able to identify invalid data present in the N−1 solid-state storage channels, and if the data is valid, reconstruct the data that was not transferred from the $N^{th}$ solid-state storage device. The valid data reconstructed by the dual parity generation engine is transferred to a stage buffer memory for subsequent transfer to a processor requesting the data to complete the read operation.

BACKGROUND OF THE INVENTION

Computer systems often employ solid-state storage devices for storage and retrieval of large amounts of data.

Solid state memory devices use electrical charges to change the physical properties of a medium to store information in a non-volatile manner. One of the inherent advantages of the solid-state memory is fast data access time and low energy consumption.

Among the solid-state memory available, a flash memory is a memory which uses floating-gate transistors arranged in NOR or NAND gates to store data for electronic devices. Flash memory is one of the most widely used non-volatile memories. However, flash memory is prone to degradation which often shortens its lifespan considerably. Another type of solid-state storage is a phase-change memory which uses the difference in electrical resistivity between two states of a material to store data for electronic devices whereby the material changes states when heated and cooled.

Solid-state memory also includes memristor memory and carbon nanotubes. Memristor memory uses the change in resistivity of the media in relation to the direction of the current applied to it to store data. Electrical resistance increases if current is applied in one direction, and decreases as current is applied in a second direction. Carbon nanotube memory uses the position of carbon nanotubes between two substrates to store data. A properly applied charge changes the position of the carbon nanotubes which changes their electrical resistance.

In a flash memory, the data may quickly be electrically erased and reprogrammed. Unlike traditional memories, such as DRAM or SRAM, the flash memory does not require power to retain the data. Unlike rotating media, there are no moving parts in flash memory. This allows flash memory to have higher bandwidth and lower latencies than traditional rotating media. Flash memory also consumes less power since no motors are required to spin or move any part of device. Flash memory is more expensive than rotating media but the advantages in speed, latency and power are making it increasingly attractive in mass storage systems.

There are two types of flash memory, i.e., NAND flash and NOR flash. Their names refer to the logic gates that are the fundamental building blocks of the memory. NOR flash is faster and more reliable than NAND flash but is more expensive. NAND flash has higher densities than NOR flash and is significantly cheaper but does not have an operational life as long as the NOR flash.

NAND flash may be implemented either as single-level cell (SLC) devices which store only one bit of information per cell, or as multi-level cell (MLC) devices which are able to store more than one bit per cell by choosing between multiple levels of electrical charge applied to the floating gates of the cells. This gives MLC devices a higher storage density than SLC devices but also may cause them to be more prone to errors and reduce the number of program/erase cycles before the cells wear out.

In memory systems, flash cells are grouped into pages. A page is the smallest "chunk" of data that may be read or programmed in one operation. Pages are typically formed with 2112 bytes of data for SLC devices, and 4314 bytes of data for MLC devices. The extra data bytes are used to store ECC (Error Correcting Code) bits and metadata information. The flash pages are then arranged into groups of 64 or 128 pages called blocks. The pages of a block may be read individually but the pages in the block must be programmed sequentially. All of the pages of a block are erased together. If a page can no longer be programmed correctly, or the block cannot be erased, then the entire block is retired.

Thousands of blocks are arranged together into a single die. A single die may only have one operation outstanding at a time, i.e., a "read", "program", or "erase". A flash part usually has 2 die per part. Flash storage devices typically have a number of parts to allow for multiple concurrent access.

Flash devices are not 100% reliable and often ship with 1-2% of the cells being defective. Data in flash cells also degrades over time and is subject to disturbances from external influences such as, for example, temperature. Extra bits for ECC are required to detect and correct the errors in the data. To prevent loss of the data, the flash storage device must monitor 10 access to the device and the ECC bits, and additionally use wear leveling to correct problems.

Wear leveling is a method of moving data between flash cells to prolong the life of the flash cells. Typically SLC devices will wear out after 100K program/erase cycles and MLC device wear out after 5K to 7K program/erase cycles.

The most prevalent source of corruption of cell data is "Program disturb", which may occur when cells not being programmed are disturbed by nearby program operations. This does not damage the cells but may corrupt the data contained therein.

"Read disturb" is also an issue with flash devices. Although being minor per each operation, this problem may accumulate over time. Traditionally the cell data will need to be refreshed after approximately one million "read" cycles for SLC and 100K "read" cycles for MLC.

Flash cells also may wear out over time since the gate levels trends towards a quiescent level. The cells also wear out with each "program"/"erase" cycle as excess charge accumulates in the dielectric. This puts a limit on the lifespan of the flash parts since the cells can no longer be used when either the "program" or "erase" operation fails. Wear leveling is used to limit number of "program"/"erase" cycles to individual cells by spreading the "program"/"erase" cycles across all of the flash cells.

The current state of flash technology may suffer from the following drawbacks:

(a) latency increases as cells wear out since more time is needed to erase cells, program the cells, and accurately read the data in the cells;

(b) "writes" typically take an order of magnitude longer than "reads";

(c) "erase" operations may take significantly longer than "writes" but are performed on an entire block;

(d) wear leveling may introduce large delays due to reading the entire block, programming to new block, and erasing the old block;

(e) wear out of cells in pages may cause delays when the pages need to be re-mapped. Pages are arranged in groups called blocks. If a single page fails then the data in the entire block of pages must be moved so the block can be retired. Controllers must check the status of "program" and "erase" operations. Blocks are marked as "bad" and can no longer be used when these operations fail;

(f) flash parts rely on ECC to protect data. Flash controllers detect and correct many errors but error correction may not always be possible. "Read" operations only return "good", "marginal" and "bad" status, where "good" indicates the data is healthy or minimal EEC correction is needed to recover the data, "marginal" indicates that the data was read but many errors were recovered or little ECC protection remains, and "failed" indicates that the data had too many errors and could not be read correctly.

Examples of Typical MLSL and SLC Parts:

| Typical part size | (MLC) | (SLC) |
|---|---|---|
| bytes per page | 4314 | 2112 |
| pages per block | 128 | 64 |
| ECC (per 512 bytes) | 4+ | 1 |
| Endurance | ~5K | ~100K |
| Read (max) | 50 us | 25 us |
| Program | 600-900 us | 200-300 us |
| Erase | 3000 us | 2000 us |

Latency Examples of MLC Parts:

Total time to read entire block=50 us/page*128 pages/blocks=6400 us (6.4 msec).

Total Min time to program entire block=600 us/page*128 pages/blocks=76800 us (76.8 msec).

Total Max time to program entire block=900 us/page*128 pages/blocks=115200 us (115.2 msec).

Total time to erase entire block–3000 us (3.0 msec).

Total time to wear level one block=(50 us/page+600 us/page)*128 pages/blocks+3000 us/block=79850 us (79.85 msec).

It is clear that the recovery operation due to a single failed page may cause significant JO delays.

Phase-change memory (also known as PCME, PRAM, PCRAM or C-RAM) uses the unique properties of amorphous and crystalline chalcogenide glass to store data. By carefully heating chalcogenide glass, it may be switched between the amorphous state which has high electrical resistance and the crystalline state which has a lower electrical resistance.

Phase-change memory has the potential to scale beyond the capacity of flash devices with faster access times. It also may endure millions of "program"/"erase" cycles before the part degrades. Unlike flash, the data stored in PRAM devices are not subject to disturbance from "reads" and nearby "writes".

However, as a disadvantage, PRAM is more susceptible to temperature changes. A device may be erased simply by heating it to a sufficient temperature.

PRAM devices are also susceptible to data deterioration due to mechanical stress on the cells since the data is in a PRAM device is stored due to a physical change in the properties of the media. The chalcogenide glass expands and contracts slightly with every "program" operation and this may cause an undesirable contact between the glass and the adjacent dielectric.

In view of the drawbacks of the current state of solid-state storage systems, a reliable prevention of the data corruption and errors detection/correction constitutes an important issue.

In order to improve the reliability of data storage systems, redundant array of disk drives have been utilized. Redundant Arrays of Independent Disks (RAID) have grown in usage. In the originally proposed five levels of RAID systems, RAID-5 systems have gained great popularity for use in local area networks and independent personal computer systems, such as for media database systems. In RAID-5, data is interleaved by stripe units across the various disk drives of the array along with error correcting parity information. However, unlike RAID-3, wherein data and parity information are stored in dedicated physical disk drives, RAID-5 distributes the data and parity information across all of the disk drives in an interleaved fashion. The data and parity information is stored in logical disk drives. The parity data in a RAID-5 system provides the ability to correct only for a failure of valid data from a single disk drive of the array.

RAID-6 systems have since been developed for data storage systems requiring a greater fault tolerance. In RAID-6, data is interleaved in striped units distributed with parity information across all of the disk drives as in the RAID-5 system. However, to overcome the disadvantage of RAID-5's inability to correct for faulty data being retrieved for more than one disk drive, the RAID-6 system utilizes a redundancy scheme that can recover from the receipt of invalid data from any two of the disk drives. Although this scheme also uses logical disk drives, an additional disk drive device is added to the array to account for the additional storage required for the second level of parity data required. The RAID-6 parity scheme typically utilizes either a two-dimensional XOR algorithm or a Reed-Solomon code in a P+Q redundancy scheme.

Even utilizing the RAID-6 architecture, such systems while having the ability to detect failures in up to two disk drives, cannot correct the data unless each disk drive in error is identified. Such is the case in the storage system architecture disclosed in U.S. Pat. No. 7,127,668, but modified with an additional parity drive for use with a dual parity engine. Without the ability to identify the disk storage channel in error, the more fault tolerant parity algorithm of the RAID-6 system is unable to provide corrected data to the requesting processor, and must therefore report a "read error" to the processor requesting the data. Thus, there is a need to provide a means for identifying the disk drive in error in such instances.

In order to provide large data capacity, a large number of disk drives are often arrayed and the additional disk drives required for two or more levels of parity data further increases the total number of disk drives in the array. As these systems send the same command to all of the disk drives, and then wait for all of the disks to finish a command before a new command is sent thereto, the data transfer rate of the memory array is limited by the "slowest" disk drive of the array. That characteristic can be particularly limiting since disk drives often exhibit unduly long access times as they begin a failure process were their performance degrades. Thus, it may be an extended period of time before they are identified as having failed by the memory system or the drive itself.

Current RAID-3 systems tried to overcome this latency problem by starting data transfers early, prior to all of the disk drives having completed a read command. This process is started so long as the data needed is already in the cache memory or can be reconstructed utilizing parity data. However, RAID-3 systems employing such techniques are unable to verify the integrity of the data being transferred to the initiator when that latency reduction technique is utilized. This method of improving latency is at a cost of data integrity, which is not an acceptable trade-off. Thus, there is a need to provide a method for reducing latency while still preserving the data integrity of the data provided by the memory system.

In comparison with disk drives, solid-state memory storage devices provide a faster access time than rotating media due to the absence of moving parts, and require less energy for operation due to the absence of motors to move the media. It therefore would be advantageous to apply the principals of the reliability used in RAID systems to the inherent advantages provided by the solid-state storage devices, and to further advance such a "hybrid" memory storage system towards substantially error-free data "read" operation through identification and auto-correction of detected errors.

SUMMARY OF THE INVENTION

It is an object of the present invention to provide a fast access and low energy consuming memory system with a high level of fault tolerance.

It is another object of the present invention to reduce latency in read operations from an array of N solid-state storage devices, where N is the number n of data storage devices plus p parity storage devices, where n is greater than one. The p parity storage devices provide a fault tolerance for a loss of valid data from at least two of the N solid-state storage devices.

The method includes the steps of performing a read operation from the array of N solid-state storage devices to provide requested data, and identify that the read operation has been completed on at least N−1 of the solid-state storage devices. The method further proceeds with the step of determining integrity of data read from the N−1 solid-state storage devices. Still further, the method includes the step of transferring the requested data to the processor requesting that data, if the data read from the N−1 solid-state storage devices is valid, and if the data read from the N−1 solid-state storage devices is invalid, the method requires waiting for all N solid-state storage devices to complete the read operation and repeat the integrity check thereof.

The present invention is also directed to a method of reducing latency in read operations from an array of solid-state storage devices arranged in N solid-state storage channels where N is a number greater than 3. The method includes the step of providing a central control system for queuing commands for the N solid-state storage channels. The method includes providing each solid-state storage channel with buffer storage and a control system for controlling operation of a corresponding solid-state storage device.

The control system is operable to receive a multiplicity of queued commands from the central control system and reorder an execution of those commands to minimize a latency of the corresponding solid-state storage device. The method further includes the step of providing a parity engine coupled to the plurality of solid-state storage channels. The parity engine uses data from at least two of the N solid-state storage channels to provide a fault tolerance for a loss of valid data from at least any two of the N solid-state storage channels.

The method also includes the steps of performing a read operation from the array of solid-state storage devices to provide requested data and identify that the read operation has completed on at least N−1 of the solid-state storage channels.

Still further, the method includes the step of determining integrity of data read from said N−1 solid-state storage channels, and, if that data is valid, transferring the requested data to the processor requesting the data. If, however, the data read from the N−1 solid-state storage channels is invalid, the method includes waiting for all N solid-state storage channels to complete the read operation and determining if the data from all N solid-state storage channels is valid.

In another aspect, the invention of the subject Patent Application is directed to a method of reducing latency in read operations from an array of solid-state storage devices arranged in N solid-state storage channels, where N is a number greater than 3. The method includes the steps of providing at least two of the N solid-state storage channels for storage of parity data, and performing a read operation from the array of solid-state storage devices to provide requested data.

The method includes the step of identifying if the read operation has been completed on at least N−1 of the solid-state storage channels. The method further includes the step of determining integrity of data read from the N−1 solid-state storage channels. If the data read from the N−1 solid-state storage channels is valid, the method proceeds with transferring the requested data to the processor requesting that data. If the data read from the N−1 solid-state storage channels is invalid, the method includes the step of waiting for all N solid-state storage channels to complete the read operation and determining if the data from all N solid-state storage channels is valid.

DESCRIPTION OF THE PREFERRED EMBODIMENT

Figure 1:
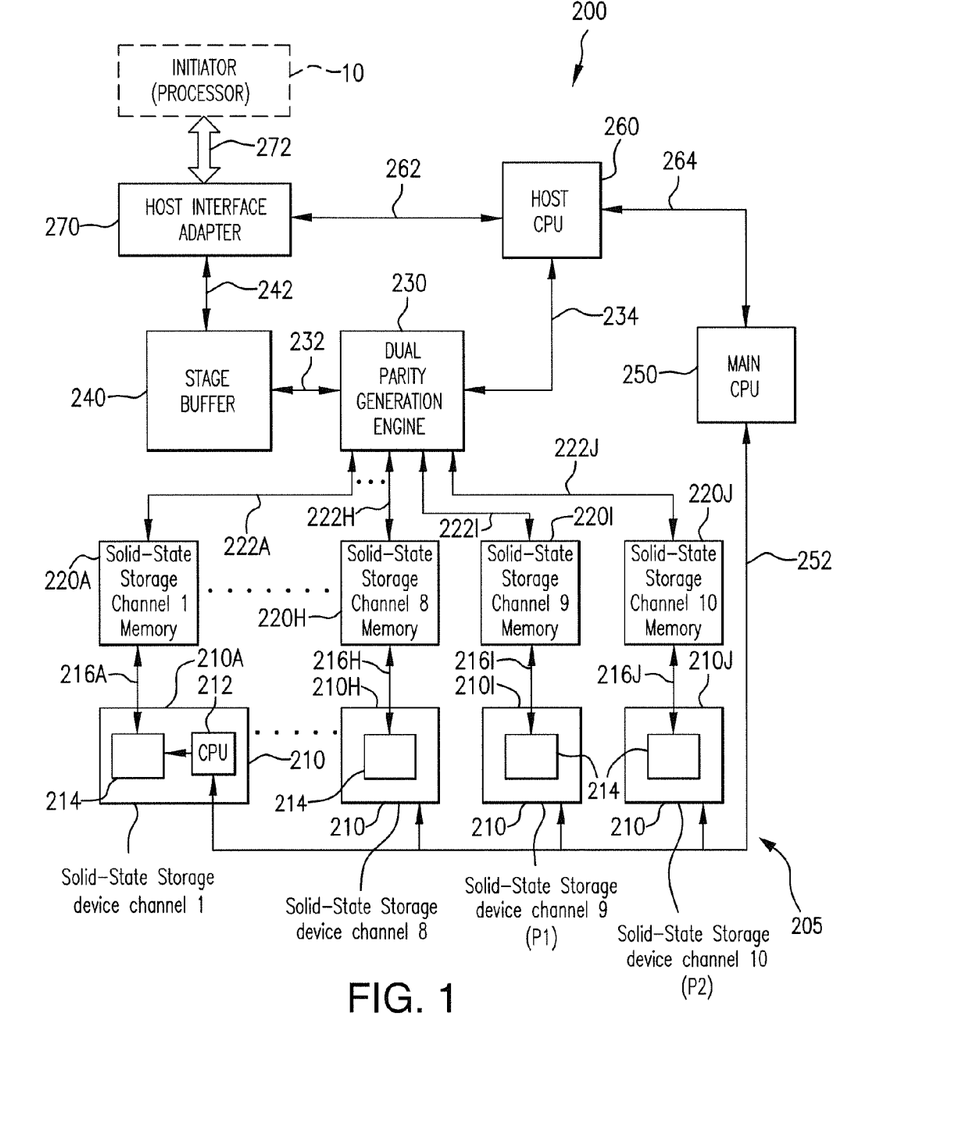
FIG. 1 is a simplified block diagram illustrating the architecture of the memory system underlying the method of the present invention.

Referring now to FIG. 1, there is shown memory system 200 for storing and retrieving data for use by one or more processors 10. As will be seen in following paragraphs, memory system 200 provides for access of data with reduced latency while still providing valid data to a requesting processor 10, hereinafter referred to also as an initiator.

Although not restricted to any particular array of data storage devices, the method of reducing latency while maintaining the integrity of the data stored in memory system 200 is illustrated herein in conjunction with a memory system using a storage array 205 which may be based on a plurality of solid-state storage devices such as, for example, flash memory, or phase-charge memory, as well as memristor memory, or carbon nanotubes memory. The memory system also is contemplated, as an example, as a system having at least two storage devices fault tolerance.

To have the capability to reduce latency in memory system 200 and maintain the integrity of the data retrieved from memory system 200 in a manner that is transparent to the initiator, requires a memory architecture which is able to tolerate a loss of valid data from at least any two of the plurality of solid-state storage devices 210 of memory system 200. Memory system 200 uses several different methods to reduce the latency in the operations thereof. Latency, as used herein, refers to the overall time to complete a command. Thus, the reduction in latency over prior art arrays of storage devices provided by memory system 200 is a measure of the high performance of data transfer provided thereby.

The array 205 is built of N solid-state storage devices 210 for storing data and parity values corresponding to the data stored in the array. The array 205 includes n solid-state storage channels 210A-210H. Extra ECC bits may be added to the data stored in solid state storage devices to help protect the data from corruption. During a "read" operation, the ECC bits are used to determine if an error was detected in the data and if the error was corrected. However, the ECC bits may not be sufficient to correct every error. The flash parts can only report that the data was "good" (or recovered with ECC), "marginal" (refresh is recommended), or "bad" (data is unreliable). However, they are not capable of reporting which portions of the data is "bad" when read. This is especially important as the size of the data in the flash blocks is larger than with MLC. Flash block sizes of 4K, 8K, 16K and larger may be used. As a result it is possible to lose the contents of the entire page because of errors in a single word of data.

As will be presented in following paragraphs, the subject method can remedy the insufficiency of ECC technique.

The reliability principles of RAID (Redundant Array of Independent Disks) systems are applied to the solid-state memory system 200. In a RAID architecture, two (2) data disk storage devices are usually considered to be a minimum number of data disk storage devices and likewise a minimum number of data disk storage channels.

In the present system, the array 205 of solid-state storage devices 210 includes p parity solid-state storage channels, which in the example illustrated herein is formed by two parity solid-state storage channels 210I and 210J, for storing check data corresponding to the data stripes stored in the n data solid-state storage channels. Since a two solid-state storage devices failure fault tolerance is required to maintain data integrity in the latency reduction scheme of memory system 200, RAID systems require a minimum of two (2) parity disk storage devices and accordingly a like minimum number of parity disk storage channels. Thus, as a minimum, N for the memory system 200 will equal four (4). Data solid-state storage channels may be formed by more solid-state storage devices, as illustrated in FIG. 1, the number being chosen based on such factors as the data capacity for memory system 200 and cost, while the number of parity storage channels may be increased to accommodate greater reliability requirements.

For simplicity, each solid-state storage channel is illustrated as containing a single solid-state storage device 210. Although not important to the inventive method described herein, in high capacity memory systems each solid-state storage channel may include multiple solid-state storage devices, and those solid-state storage devices may be arranged in a plurality of tiers. Data and parity solid-state storage devices, as well as data and parity storage channels, may be either physical or logical devices/channels.

Memory system 200 provides increased storage functions and reliability through redundancy, and storage virtualization similar to RAID systems in which data storage devices are implemented as solid-state storage devices. For example, if flash memory is used, individual flash pages may be correlated to individual disk blocks of RAID systems. Additionally, the solid-state die (or chip) may be correlated with a single disk of a RAID system.

Similar to RAID systems, in the subject solid-state memory system 200, the computer data storage scheme may divide and replicate data among multiple solid-state storage devices 210. The array 205 is accessed by the operating system as one single solid-state storage. Different data storage schemes or architectures may be used in the memory system 200, depending on the desired balance between data reliability and input/output performance.

For example, data may be written identically to multiple solid-state storage devices. The array 205 then continues to operate as long as at least one drive is functioning.

Alternatively, the bit-level striping with dedicated Hamming-code parity may be used, when data is striped such that each sequential bit is on a different solid-state storage device. Hamming-code parity is calculated across corresponding bits on a solid-sate storage device and stored on at least one parity solid-state storage device.

The memory system 200 may use byte-level striping with dedicated parity where data is striped so each sequential byte is on a different solid-state storage device. Parity is calculated across corresponding bytes on the data solid-state storage device and stored on a dedicated parity solid-state storage device.

Further, the memory system 200 may use block-level striping with dedicated parity scheme. With this scheme, all parity data is confined to a single solid-state storage device. This however may create a performance bottleneck.

The memory system 200 also may be based on block-level striping with distributed parity architecture, which distributes parity along with the data and requires all solid-state storage devices but one to be present to operate. The array 205 is not destroyed by a single solid-state storage device failure. Upon drive failure, any subsequent reads may be calculated from the distributed parity such that the drive failure is masked from the end user.

In another alternative implementation, the memory system 200 may use block-level striping with double distributed parity which provides fault tolerance of two solid-state storage devices failures. The array 205 may continue to operate with up to two failed storage channels.

Utilizing a dual parity generation engine 230, memory system 200 provides two parity solid-state storage channels, for example, channels 9 and 10, to provide two parity solid-state storage channels. Where solid-state storage channels 9 and 10 are physical parity storage channels, they are dedicated to parity data storage. Each of the solid-state storage devices 210 includes a control central processing unit (CPU) 212 for controlling the operation of the solid-state storage media 214, which are representatively shown for only the solid-state storage channel 210A (for clarity). Each of the solid-state storage channels 210A-210J is respectively coupled to a solid-state storage channel memory 220A-220J through a corresponding data bus 216A-216J. Each of the solid-state storage channel memories 220A-220J acts as a data cache for data being read from and written to the corresponding solid-state storage devices 210. The solid-state channel memories 220A-220J may be separate and distinct dual port memories, or a single dual port memory which is divided into a plurality of subunits corresponding to the data strips for each of the solid-state storage channels.

The data read into the plurality of solid-state channel memories 220A-220J is read by a dual parity generation engine 230, processed to determine the validity of the data, and the data transferred to a stage buffer 240. The data read from the plurality of solid-state storage channel memories 220A-220J is transferred to the dual parity generation engine 230 by means of a corresponding data bus 222A-222J. The data transferred on each data bus 222A-222J includes the corresponding data read from the solid-state storage channels 210A-210J, plus additional parity bits added to enable detection of transmission errors between the solid-state storage channel memories 220A-220J and the dual parity generation engine 230.

The dual parity generation engine 230 may be a processor which implements a dual parity two-dimensional XOR algorithm or a Reed-Solomon P+Q algorithm having the ability to detect a loss of valid data from two of the plurality of solid-state storage channels 210A-210J. The dual parity generation engine can also be provided as a hardware implementation of the particular dual parity algorithm being utilized. Although the particular implementation of the dual parity generation engine and the dual parity algorithm are not important to the inventive concepts, as described herein, a field programmable gate array implementing a two-dimensional XOR algorithm has been successfully used to implement the dual parity generation engine in one working embodiment of the present invention.

The dual parity generation engine 230 transfers the data to the stage buffer 240 through a data bus 232 controlled and monitored by a host CPU 260 through a bus 234. Stage buffer 240 is a dual port memory which provides validated data to a host interface adaptor 270 through a direct memory access (DMA) bus 242.

Host interface adaptor 270, under control of host CPU 260, through the host interface control bus 262, provides the data read from the stage buffer 240 to an initiator 10 through an interface bus 272. Host interface adaptor 270 provides the bus conversion between the DMA bus 242 and the interface bus 272. Interface bus 272 may be a peripheral component interconnect (PCI) bus, a peripheral component interconnect extended (PCI-X) bus, a peripheral component interconnect express (PCIe) bus, a hyper transport (HTX) bus, or any other internal high speed communication bus appropriate for interfacing memory system 200 with one or more initiators 10. Where memory system 200 is an external peripheral to a computer system or network, interface bus 272 may be a distributed bus such as Ethernet or fiber channel, or other high speed distributed bus architecture.

Main CPU 250 monitors and controls the operation of the plurality of solid-state storage channels 210A-210J through a control bus 252. As representatively shown with respect to the solid-state storage channel 210A, main CPU 250 communicates with a CPU 212 of each respective solid-state storage device 210, in order to provide commands for the read and write operations of the respective solid-state storage devices and monitor the status thereof. Main CPU 250 communicates with the host CPU 260 through the CPU control and communications bus 264, signaling the host CPU when the read or write operations of the solid-state storage channels have been completed. Host CPU 260 controls the dual parity generation engine 230 through the bus 234 to test and transfer data from the plurality of solid-state storage channel memories 220A-220J to the stage buffer 240. After a transfer of valid data has been completed, CPU 260 will instruct the host interface adaptor 270 to transfer the data from the stage buffer 240 to the initiator 10.

Host interface adapter 270 may interface with multiple initiators 10, each requiring various read and write operations to be sequentially carried out. Main CPU 250 manages a queue of a sequence of commands for each solid-state storage device 210 and transmits multiple commands to CPU 212 of each respective solid-state storage device 210. Responsive to status communications from each CPU 212, main CPU 250 is able to keep track of the disk commands that are outstanding for each solid-state storage device 210. As one means of reducing latency, each CPU 212 is programmed to analyze the sequence of commands received from main CPU 250 and reorder that sequence to provide the best performance and the lowest overall latency. As an example, each CPU 212, at any time, chooses a command to execute from the plurality of commands from the queue based on the angular position of the solid-state media. The command selected is the one that requires the least amount of media rotation to place the required portion of the solid-state media under the drive's heads to execute the read or write command. Thus, each of the solid-state storage devices 210 independently executes commands, based on whatever sequence of commands can be executed with the least latency.

Main CPU 250 keeps track of the commands completed by each solid-state storage device 210 and notifies host CPU 260 when particular write commands have been completed and when the data read from the solid-state storage devices 210 is available in the solid-state storage channel memories 220A-220J for processing by dual parity generation engine 230. As will be described in following paragraphs, main CPU 250 is able to further reduce the latency of memory system 200 by not waiting for all of the solid-state storage devices 210 to finish a read operation before informing the host CPU 260 that the data is ready for processing by dual parity generation engine 230.

Main CPU 250 need not report to host CPU 260 that data is ready for processing by dual parity generation engine 230 before all of the solid-state storage devices 210 have completed a particular read command if the last solid-state storage device (the $N^{th}$ solid-state storage device) completes the read operation within a set time period. By waiting for all N solid-state storage devices 210 to finish a particular read operation before dual parity generation engine 230 processes the data read, memory system 210 is able to take full advantage of the dual parity generation engine's ability to detect a loss of valid data from two of the plurality of solid-state storage channels.

However, when the $N^{th}$ solid-state storage device takes an unduly long time to provide data to the corresponding solid-state channel memory, main CPU 250 will signal host CPU 260 to begin the integrity check with the data supplied by N−1 solid-state storage devices. Thus the amount of time that the $N^{th}$ solid-state storage device lags behind the $N^{th}$−1 solid-state storage device to finish the particular read command is saved. That savings in time can be significant. It has been observed that often before solid-state storage devices are considered to have reached a "failed" status, they exhibit longer access times than other solid-state storage devices in the array executing the same command. A solid-state storage device in that condition will affect the latency of the memory array over thousands of memory read/write operations before its operation degrades to the point that it is designated as having "failed." The ability to provide valid data to the initiator 10 without having to wait for a solid-state storage device that takes unduly long to complete a read command provides a significant improvement in performance of memory system 200.

The data not supplied from the $N^{th}$ solid-state storage device is identified to dual parity generation engine 230 as invalid data by host CPU 260, based on the status information it receives from main CPU 250. Since dual parity generation engine 230 can tolerate a loss of valid data from two of the plurality of solid-state storage channels, and can reconstruct valid data if invalid data is detected from one known solid-state storage channel, dual parity generation engine 230 can reconstruct the data from the $N^{th}$ solid-state storage channel if the data from the N−1 solid-state storage channels is acceptable, and can detect when it is not. Thus, latency is able to be reduced without sacrificing the integrity of the data supplied to the initiator 10.

If the transfer status returned by the dual parity generation engine 230 to the host CPU 260 indicates the data is invalid, host CPU 260 will begin the error recovery procedure. The first step in error recovery is to wait for the $N^{th}$ solid-state storage device to complete the particular read operation. With data from all of the solid-state storage devices, the data transfer from the solid-state storage channel memories 220A-220J to the stage buffer 240 is repeated through dual parity generation engine 230, to recheck the integrity of the data and possibly reconstruct invalid data provided from one of the N−1 solid-state storage channels. If the data is still determined to be invalid, the transfer from the plurality of solid-state storage channel memories 220A-220J through the dual parity generation engine 230 to the stage buffer 240 will then be repeated. This retry of the transfer repairs most soft data errors and soft bus parity errors. If the retry does not produce valid data, the host processor 260 will initiate an auto-correction technique, such as that disclosed in co-pending patent application Ser. No. 11/844,664, entitled Method For Auto-Correction Of Errors In A Raid Memory System, filed 24 Aug. 2007, or simply repeating the execution of the entire read command and validation of the data.

Figure 2:
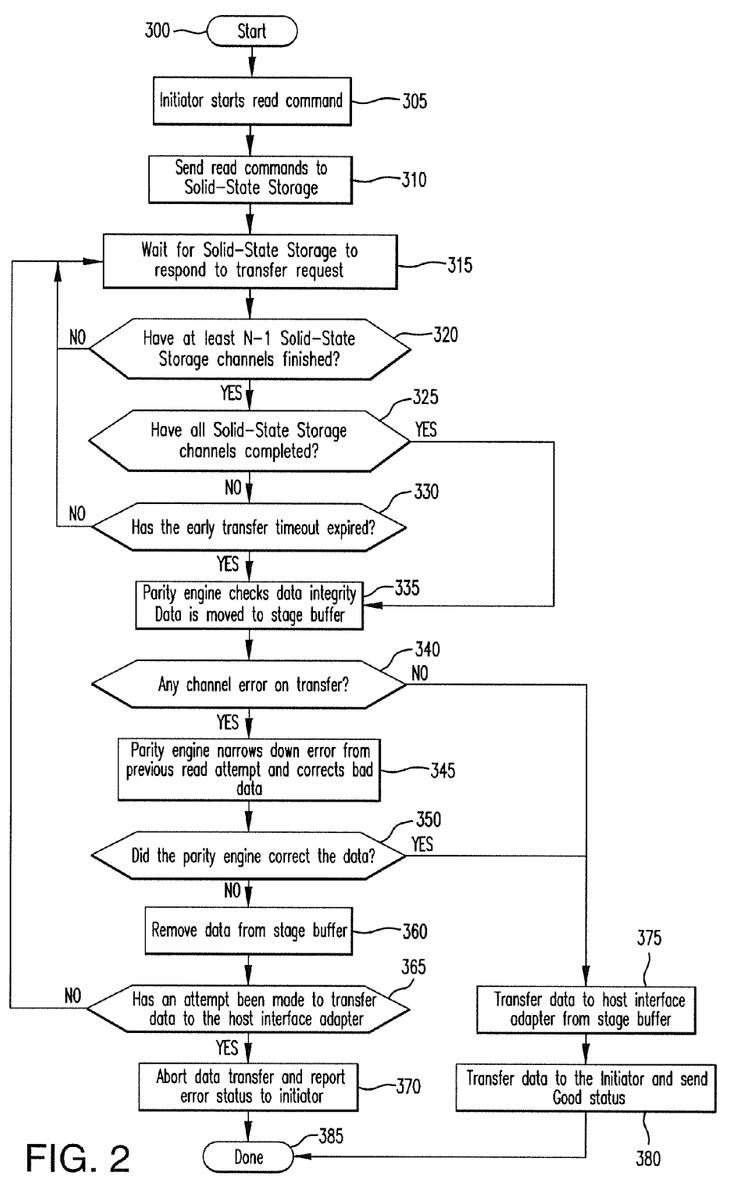
FIG. 2 represents a flow diagram of the method for reducing latency while preserving data integrity of the present invention.

Referring now to FIG. 2, there is shown a flow chart illustrating a read operation of memory system 200 using the latency reduction method of the present invention, wherein latency is reduced while maintaining the integrity of the data retrieved from memory system 200. The method flow is initiated in block 300 and flows to block 305 where a read command is sent by an initiating processor 10 to memory system 200. The flow then moves to block 310 wherein the read command is sent to the plurality of solid-state storage devices 210A-210J. From block 310, the flow then moves to block 315, wherein the main CPU 250 waits and monitors the status of the solid-state storage devices 210, in order to respond to the request to transfer data from the solid-state storage devices 210 to the initiator 10.

The flow then proceeds from block 315 to decision block 320, wherein it is determined whether at least N−1 of the solid-state channels (9 channels in the example illustrated in FIG. 1) have finished executing the read command. If the at least N−1 of the solid-state storage channels have not completed execution of the read command, the flow passes back to block 315 and the process continues in a loop until N−1 of the solid-state storage channels have completed execution of the read command. When at least N−1 solid-state storage channels have completed execution of the read command, the flow passes to decision block 325. In block 325 it is determined whether all N of the solid-state storage channels have completed execution of the read command. If N−1 of the solid-state storage channels have completed execution of read command, rather than all N solid-state storage channels, the flow passes to decision block 330, where it is determined whether the time taken for N−1 of the solid-state storage channels to execute the command has exceeded a predetermined time limit. If the time limit has not been exceeded, then there is sufficient time to wait for the $N^{th}$ solid-state storage channel to provide its data and thereby maximize the fault tolerance provided by the dual parity generation engine 230. Thus, if the time has not expired, the flow passes from decision block 330 back to block 315, wherein main CPU 250 waits for the $N^{th}$ solid-state storage channel to complete execution of the read command.

The time limit is selected as a function of the size and/or type of solid-state storage devices being used in memory system 200. In one working embodiment, a time limit is selected within a range of 0 to 25 seconds, where a zero value is selected if there is to be no timeout and integrity is to be checked whenever N−1 solid-state storage channels have completed execution of the read command. If the timeout period has expired, then the flow passes to block 335, wherein the integrity of the data from the N−1 solid-state storage channel is checked and data transferred to the stage buffer 240.

If, when the flow passes to decision block 325, all N of the solid-state storage channels have completed the execution of the read command, the flow will then pass to block 335. In block 335 the parity engine checks the integrity of the data and transfers the data output from the dual parity engine 230 to the stage buffer 240.

The flow passes to decision block 340 from block 335, where the status from dual parity engine 230 is checked to determine whether any parity error occurred in any of the solid-state storage channels on the transfer to the stage buffer. If no error has occurred on the transfer, the logic flow passes to block 375 where the data is transferred from the stage buffer to the host interface adaptor 270. From block 375, the flow passes to block 380 wherein the data is transferred from the host interface adaptor 270 to the initiator along with a status indication that the data is good. From block 380, the logic flow then exits the routine at 385.

If, in decision block 340 a channel error is detected on the transfer, the flow passes to block 345. In block 345 the parity engine narrows down the error utilizing information from the previous read attempts, and corrects the invalid data, as described in the above-referenced patent application Ser. No. 11/844,664 and incorporated by reference as if presented herein. Briefly, the correction process involves testing the data to identify the solid-state storage channel in error, including sequentially excluded data read from a different one of the plurality of solid-state storage channel memories 220A-220J from a parity check and determining the validity of data from remaining solid-state storage channel memories. If valid data is obtained, the solid-state storage channel from which the data was excluded is identified as the solid-state storage channel in error. With the solid-state storage channel in error identification having been made, the dual parity configuration of memory system 200 permits the data from that identified solid-state storage channel to be reconstructed.

From block 345, the flow passes to decision block 350, wherein the parity engine status is checked to determine whether the data was able to be corrected. If the data was corrected, then the flow passes sequentially to blocks 375, 380 and 385 to transfer to the initiator 10, as previously described.

If the data could not be corrected, as when there are data errors in multiple solid-state storage channels, the flow passes to block 360. In block 360, the data is removed from the stage buffer 240. From block 360, the flow passes to decision block 365, wherein it is determined whether an attempt to transfer data to the host interface adaptor 270 had been previously attempted. By attempting to transfer data to the host interface adaptor 270 it is meant that a transfer of data from the solid-state channel memories to the stage buffer through the dual parity engine had been made. If such a transfer had not been previously been made, and thus there had been no attempt to transfer data to the host interface adaptor, the flow passes back to block 315 where the main CPU 250 then waits for the $N^{th}$ solid-state storage channel to complete execution of the read command. If a previous attempt to transfer data to the host interface adaptor had been made, however, the flow then passes from decision block 365 to block 370. In block 370 the data transfer is aborted and host CPU 260 reports to the initiator 10, through host interface adapter 270, an error status for the read command, allowing the initiator 10 to determine whether the read command should be repeated. From block 370, the flow then exits the routine at block 385.

Therefore, it can be seen that memory system 200 provides a method of reducing latency while still maintaining data integrity in READ operations from an array of N solid-state storage devices, where N equals n data storage devices, n being greater than 1, plus p parity storage devices, where the p parity storage devices provide a fault tolerance for a loss of valid data from at least two of N solid-state storage devices. The READ command is transferred from the main CPU 250 to each of the N solid-state storage devices, and main CPU 250 monitors the progress of the N solid-state storage devices, identifying when the read operation has been completed by at least N−1 of the solid-state storage devices.

If an established time period has expired by the time N−1 of the solid-state storage devices has completed the READ operation, the data from the N−1 solid-state storage devices is checked to determine its integrity.

The use of the time period allows use of the data from all N solid-state storage channels when none of solid-state storage devices takes excessively long to perform a READ operation, and thereby take full advantage of the capabilities of dual parity generation engine 230. However, this timeout feature may be eliminated in memory system 200 and the transfer process will then simply begin when N−1 of the solid-state storage devices 210 have completed execution of the particular READ command.

If the data read from the N−1 solid-state storage devices is valid, the data requested by the initiator processor is transferred thereto. If, however, the data read from the N−1 solid-state storage devices is invalid, main CPU 250 will then wait for the $N^{th}$ solid-state storage device to complete execution of the READ command and then signal the host CPU 260 to initiate the dual parity generation engine 230 to determine the integrity of the data read from the N solid-state storage devices.

The method step of performing the READ operation includes a transfer of the data read from the media of each solid-state storage device to a solid-state storage channel memory 220A-220J. The integrity of the data transferred to the solid-state storage channel memories 220A-220J is carried out by the dual parity generation engine 230 which also carries out a transfer of the data from the solid-state storage channel memories 220A-220J to the stage buffer 240.

In the event that the dual parity generation engine 230 determines that the transferred data is invalid, the data transferred to stage buffer 240 is removed therefrom. The fault tolerance provided by the dual parity generation engine 230 allows for the transfer of data from N−1 of the solid-state storage channels, and if that data is valid, provides for the regeneration of the missing data, the data from the $N^{th}$ solid-state storage device 210. Thus, by this method, the performance of memory system 200 is enhanced by a reduced latency during read operations, and the integrity of the data supplied to the initiator 10 is assured.

While the present invention has been particularly described with reference to FIGS. 1 and 2, a particular number of solid-state storage devices in the array, and a particular arrangement of processors to control operation of the memory system, it should be understood that the Drawing figures are for illustration only and should not be taken as limitations upon the invention. It is further contemplated that many changes and modifications may be made to the invention, by one of ordinary skill in the art, without departing from the spirit and scope of the invention as disclosed herein. In particular, equivalent elements may be substituted for those specifically shown and described, various method steps may be interchanged, and while the present invention has been described as advantageously implemented in various hardware and software components, it will be appreciated that some of those components implemented in hardware, may be implemented equally well in software, and conversely, some elements implemented in software may be implemented in hardware or firmware as well, all without departing from the spirit or scope of the invention as defined in the appended claims.

What is being claimed is:

1. A method of reducing latency in read operations from an array of N solid-state storage channels, where N equals n data storage channels plus p parity storage channels, where n is greater than one, and the p parity storage channels provide a fault tolerance for a loss of valid data from at least two of said N solid-state storage channels, the method comprising the steps of:
   a. sending read commands to said array of N solid-state storage channels, each read command being sent to all of the N solid-state storage channels simultaneously;
   b. performing a read operation for each read command from all of said array of N solid-state storage channels to provide requested data;
   c. identifying said read operation has completed on N−1 of said solid-state storage channels;
   d. determining integrity of data read form said N−1 solid-state storage channels;
   e. if said data read from said N−1 solid-state storage channels is valid, reconstructing data of a solid-state storage channel not having completed said read operation, and transferring said requested data to a processor requesting said data, and if said data read from said N−1 solid-state storage channels is invalid, waiting for all of the solid-state storage channels to then complete said read operation and determining integrity of data read from all said N solid-state storage channels;
   f. reconstructing data of any one solid-state storage channel found to be invalid from said determination of integrity of said data read from all said N solid-state channels; and
   g. repeating said steps (a)-(f) responsive to data from more than one solid-state channel being found to be invalid to correct for soft data errors.

2. The method as recited in claim 1, wherein the step of performing a read operation for each read command includes the step of respectively transferring data read from said plurality of solid-state storage channels to corresponding solid state storage channel memories.

3. The method as recited in claim 2, wherein the step of determining the integrity of data read from said N−1 solid-state storage channels includes the step of using a dual parity generation engine to perform a parity check of said data read from said N−1 solid-state storage channels.

4. The method as recited in claim 3, wherein the step of using a dual parity generation engine to perform a parity check includes the step of using said dual parity generation engine to transfer said data read from N−1 of said solid-state storage channel memories to a buffer memory while performing said parity check.

5. The method as recited in claim 4, wherein the step of determining the integrity of data includes the step of removing said data read from said N−1 solid-state storage channels from said buffer memory responsive to a determination that said data read from said N−1 solid-state storage channels is invalid.

6. The method as recited in claim 1, wherein the step of determining integrity of data includes the step of using said data read from said N−1 solid-state storage channels to regenerate said data from the solid-state storage channel not having completed said read operation responsive to determining said data read from said N−1 solid-state storage devices is valid, and the step of reconstructing data of a solid-state storage channel not having completed said read operation is followed by the step of determining integrity of said reconstructed data.

7. The method as recited in claim 1, wherein the step of determining the integrity of data includes the step of using a dual parity generation engine to perform a parity check of said data read from said N−1 solid-state storage channels.

8. A method of reducing latency in read operations from a plurality of solid-state storage devices arranged in N solid-state storage channels, where N is a number greater than 4, the method comprising the steps of:
   a. providing a central control system for queuing commands for said N solid-state storage channels;
   b. providing each solid-state storage channel with a buffer storage and a control system for controlling operation of a corresponding solid-state storage device, said control system being operable to receive a multiplicity of queued commands from said central control system and reorder an execution of said commands to minimize a latency of said corresponding solid-state storage device;
   c. providing a parity engine coupled to said N solid-state storage channels, said parity engine utilizing data from at least two of said N solid-state storage channels to provide a fault tolerance for a loss of valid data from at least any two of said N solid-state storage channels;
   d. sending read commands to said N solid-state channels, each read command being sent to all of the N solid-state channels simultaneously;
   e. performing a read operation of each read command from all of said solid-state storage channels to provide requested data;
   f. identifying said read operation has completed on N−1 of said solid-state storage channels;
   g. determining integrity of data read from said N−1 solid-state storage channels;
   h. if said data read from said N−1 solid state storage channels is valid, reconstructing data of a solid-state storage channel not having completed said read operation and transferring said requested data to a processor requesting said requested data, and if said data read from said N−1 solid-state storage channels is invalid, waiting for all solid-state storage channels to complete said read operation and determining integrity of data read from all said N solid-state storage channels;
   i. reconstructing data of any one solid-state storage channel found to be invalid from said determination of integrity of said data read from all said N solid-state storage channels; and
   j. repeating said steps (d)-(i) responsive to data from more than one solid-state storage channel being found to be invalid to correct for soft data errors.

9. The method as recited in claim 8, wherein the step of performing a read operation of each read command includes the step of respectively transferring data read from said corresponding solid-state storage device of each solid-state storage channel to the buffer storage of the solid-state storage channel.

10. The method as recited in claim 9, wherein the step of determining integrity of data includes the step of using said parity engine to transfer said data contained in said buffer storage of said N−1 solid-state storage channels to a stage buffer memory while performing a parity check of said data transferred from said buffer storage of said N−1 solid-state storage channels.

11. The method as recited in claim 10, wherein the step of determining the integrity of data includes the step of removing said data contained in said stage buffer memory therefrom responsive to a determination that said data is invalid.

12. The method as recited in claim 8, wherein the step of determining integrity of data includes the step of using said data read from said N−1 solid-state storage channels to regenerate said data from the solid-state storage channel not having completed said read operation responsive to determining said data read from said N−1 solid-state storage channels is valid, and the step of reconstructing data of a solid-state storage channel not having completed said read operation is followed by the step of determining integrity of the reconstructed data.

13. The method as recited in claim 8, wherein the step of providing a parity engine includes the step of providing a dual parity generation engine to perform a parity check of said data read from said N−1 solid-state storage channels.

14. A method of reducing latency in read operations from an array of solid-state storage devices arranged in N solid-state storage channels, where N is a number greater than 3, the method comprising the steps of:
   a. providing at least two of said N solid-state storage channels for storage of parity data;
   b. sending read commands to said N solid-state storage channels, each read command being sent to all of the N solid-state storage channels simultaneously;
   c. performing a read operation for each read command from all of said N solid-state storage channels to provide requested data;
   d. identifying said read operation has completed on N−1 of said solid-state storage channels;
   e. determining integrity of data read from said N−1 solid-state storage channels;
   f. if said data read from said N−1 solid-state storage channels is valid, reconstructing data of a solid-state storage channel not having completed said read operation and transferring said requested data to a processor requesting said requested data, and if said data read from said N−1 solid-state storage channels is invalid, waiting for all solid-state storage channels to complete said read operation, and determining if said data read from all said N solid-state channels is valid;
   g. reconstructing data of any one solid-state storage channel found to be invalid from said determination of integrity of said data read from all said N solid-state storage channels; and h. repeating said steps (b)-(g) responsive to data from more than one solid-state storage channel being found to be invalid to correct for soft data errors.

15. The method as recited in claim 14, wherein the step of performing a read operation for each read command includes the step of respectively transferring data read from said N solid-state storage channels to corresponding solid-state storage channel memories.

16. The method as recited in claim 15, wherein the step of determining the integrity of data includes the step of using a dual parity generation engine to perform a parity check of said data read from said N−1 solid-state storage channels.

17. The method as recited in claim 16, wherein the step of using a dual parity generation engine to perform a parity check includes the steps of using said dual parity generation engine to transfer said data read from said N−1 solid-state storage channels to a stage buffer memory, and performing said parity check.

18. The method as recited in claim 17, wherein the step of determining the integrity of data includes the step of removing said data contained in said stage buffer memory therefrom responsive to a determination that said data read from said N−1 solid-state storage channels is invalid.

19. The method as recited in claim 14, wherein the step of determining integrity of data includes the step of using said data read from said N−1 solid-state storage channels to regenerate said data from the solid-state storage channel not having completed said read operation responsive to determining said data read from said N−1 solid-state storage channels is valid, and the step of reconstructing data of a solid-state storage channel not having completed said read operation is followed by the step of determining integrity of the reconstructed data.

20. The method as recited in claim 14, wherein the step of determining the integrity of data includes the step of using a dual parity generation engine to perform a parity check of said data read from said N−1 solid-state storage channels.

* * * * *